UNITED STATES PATENT OFFICE.

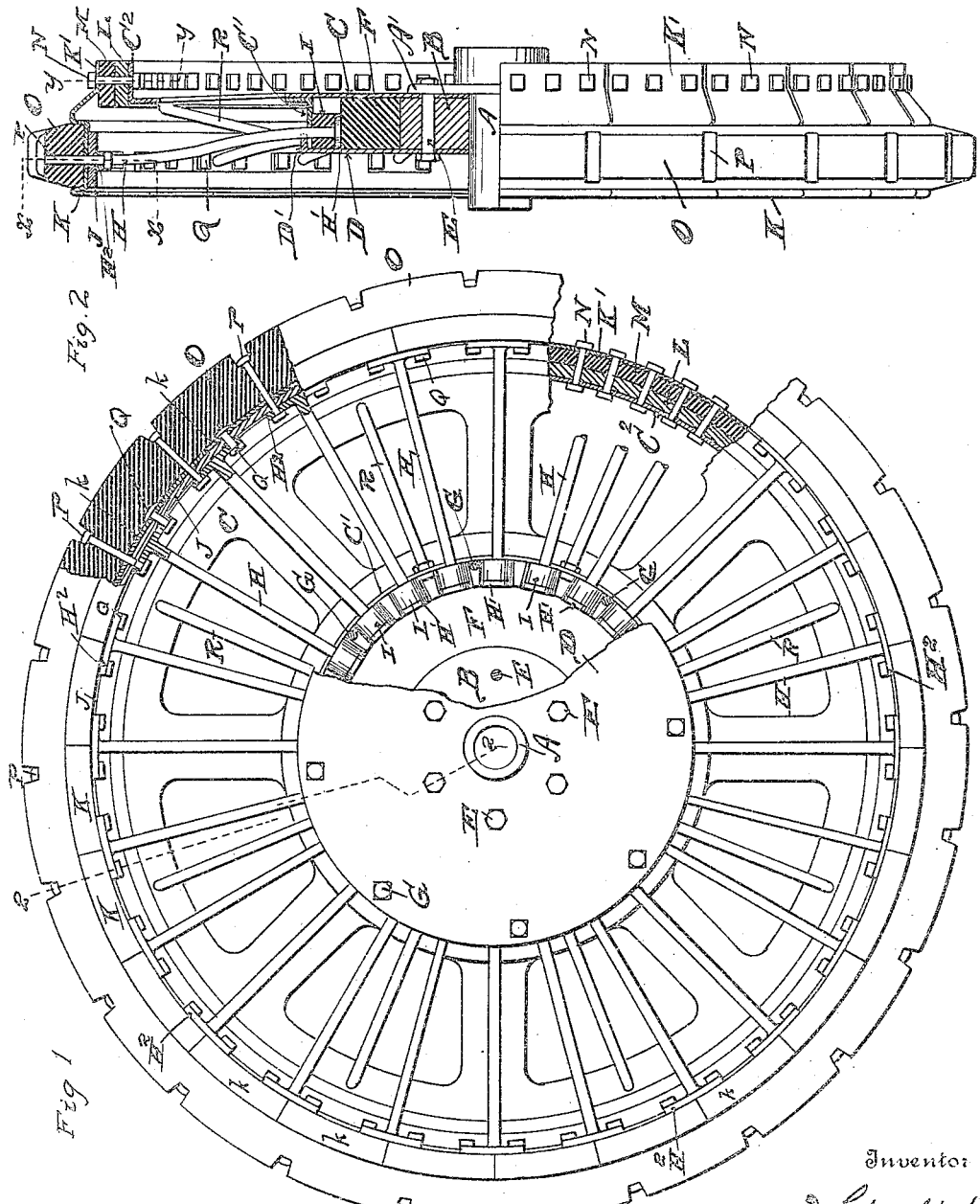

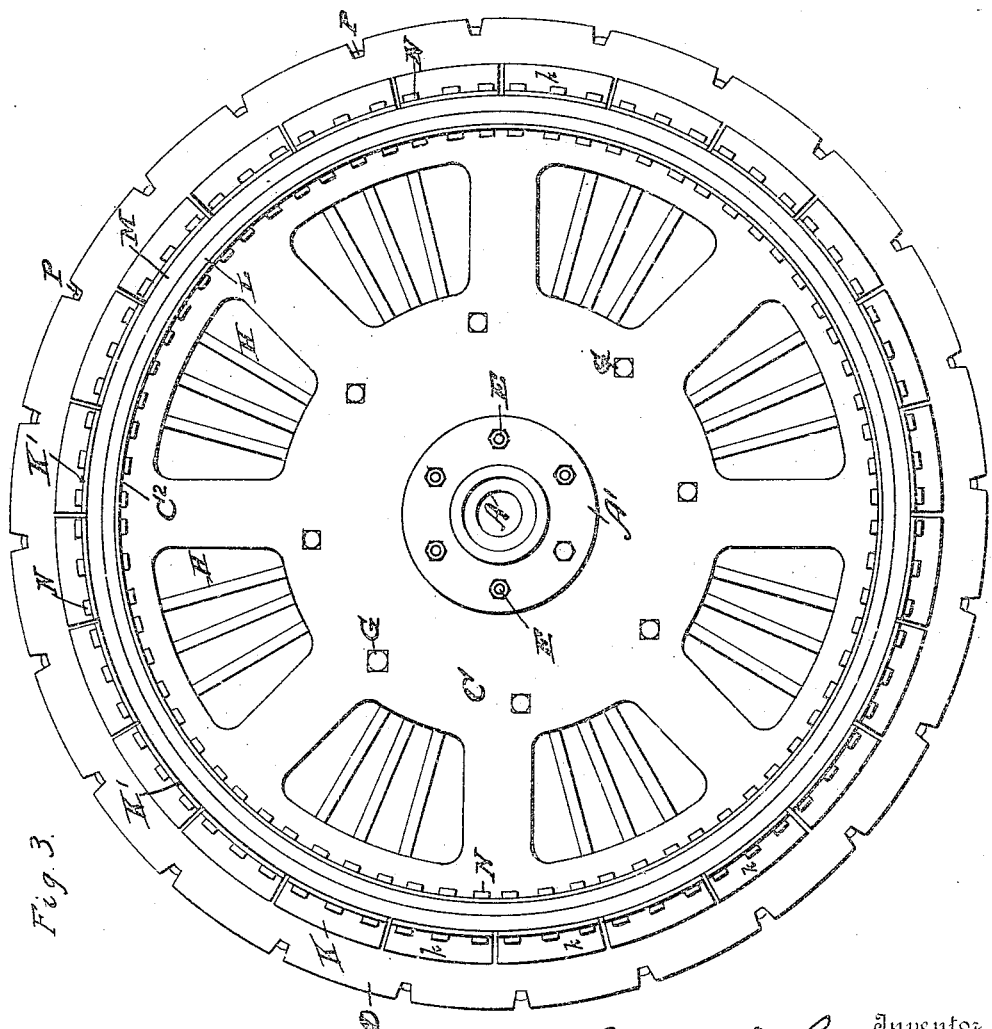

JAMES D. GARLICK, OF PORT HURON, MICHIGAN.

VEHICLE-WHEEL.

1,256,682.

Specification of Letters Patent.  Patented Feb. 19, 1918.

Application filed September 29, 1917.  Serial No. 193,874.

*To all whom it may concern:*

Be it known that I, JAMES D. GARLICK, a citizen of the United States, residing at Port Huron, county of of St. Clair, State of Michigan, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates to an improvement in vehicle wheels, shown in the accompanying drawings and more particularly pointed out in the following specification and claims.

The invention consists in the general construction of the wheel and one of its objects is to furnish a resilient non-skid wheel especially designed for the rear axle of motor-driven vehicles but which may be employed on both the front and rear axles, the construction being such that the usual brake drum employed on the rear wheels may be readily attached thereto.

Another object of the invention is to provide a resilient wheel which is especially adapted for long and hard usage but which in the event of an accident may be easily and readily repaired at a minimum expenditure for labor and parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the same.

In the accompanying drawings:

Figure 1 is an elevation of the wheel, with portions in section on line $x$—$x$ (Fig. 2), to show the method of securing the tire to the divided rim, and also on line $y$—$y$, to show the resilient ring bolted between the inside integral spoke-disk and the divided resilient rim.

Fig. 2 is a front elevation of the wheel with parts in section on line 2—2 of Fig. 1, showing the manner of securing the tire to the divided resilient rim and the resilient annular footing for the spokes and also other details of construction.

Fig. 3 is an elevation of the wheel on the side next to the vehicle showing more particularly the integral spoke-disk and the resilient ring between the disk and the divided resilient rim.

Referring now to the letters of reference placed upon the drawing:—

A, denotes a metallic hub, having a projecting flange A′, integral therewith.

B, designates a wooden collar encircling the hub. C indicates a disk having spokes integral therewith forming the inner face of the wheel, and D, is a relatively smaller disk on the outer face of the wheel, between which disk the wooden collar is secured by a plurality of bolts E, projecting through the latter, the flange and each of the disks. Encircling the wooden collar is a rubber ring F. Integral with the disk D, and spaced from the rubber ring is an inwardly directed flange D′, adapted to receive the projecting rim of an opposing annular flange C′, secured to the disk C. G designates a plurality of bolts connecting the disks C and D, together, beyond the periphery of the rubber ring F.

H, indicates a plurality of spokes respectively provided with an enlarged head H′, and extending through slots formed in the rim of the flange C′.

Interposed between the head of the spokes and flange C′, and sleeved upon the respective spokes are relatively small rubber disks I. The outer end of each of the spokes is provided with a cross-head H², bolted to an annular ring J. Secured to the outer face of the ring J, is a divided resilient rim or channel member K, consisting of a plurality of sections $k$, having a projecting flange K′ spaced from a peripheral flange C², formed on the disk C. Encircling the flange C², is a ring L, and surrounding the latter and adjacent to the projecting flanges K′, of the channel members K, is a rubber ring M. N, designates a plurality of bolts extending through the flanges K′ of the channel members K, the rubber ring M, and the metallic ring L, to secure these several elements together.

O, indicates a rubber tire notched to provide against skidding and to receive the heads of T-headed bolts P, each extending through the tire, the divided resilient channel member K, the annular ring J, and one side of the cross-head H′, of each of the spokes H. Q, designates a plurality of bolts connecting the other portion of the cross-head H' of the spokes with the ring J, and the divided resilient channel member K. R, indicates a plurality of inclined brace rods, secured at one end to the disk C, near its outer edge, said rods being bolted at their opposite end to the flange C,' brazed or otherwise secured to the disk.

Having thus described my invention, what I claim is:

1. In a vehicle wheel, a metallic disk having an offset peripheral flange, an annular transversely divided resilient channel member having offset flanges, an elastic ring between the respective flanges of the disk and divided channel member, a plurality of bolts for securing the said elements together, a resilient tire bolted to said channel member, a plurality of spokes each having a cross-head respectively bolted to the abutting sections of the channel member, and a yieldable support adapted to receive and sustain the thrust of the opposite end of said spokes.

2. In a vehicle wheel, a metallic disk having an offset peripheral flange, an annular transversely divided resilient channel member having offset flanges, a rubber ring bolted between the respective flanges of the disk and channel member, a resilient tire mounted in said channel member, a plurality of spokes having enlarged heads at their inner ends and cross-heads at their outer ends bridging the respective abutting divisions of the channel member, a plurality of bolts to secure the tire, channel member, and cross-heads of the bolts together, an annular flange slotted for the passage of the spokes bolted to the metallic disk, resilient elements between the enlarged heads of the spokes and the last named flange, and a rubber ring encircling the hub of the wheel adapted to receive the end thrust of the spokes.

3. In a vehicle wheel, a hub, a metallic disk mounted on the hub having a peripheral flange, a relatively smaller disk mounted on the hub, a wooden collar sleeved on the hub between the disks, a plurality of transverse bolts to secure the disks and wooden collar together, a rubber ring encircling the wooden collar, an annular channel formed in sections having an offset flange, a resilient element bolted between the flanges of the annular channel member and the peripheral flange of the metallic disk, a tire lodged in the annular channel member, a plurality of spokes each having a cross head bolted to abutting sections of the channel and an enlarged head at its opposite end bearing upon the rubber ring, a slotted annular flange spaced from the ring through which the spokes extend bolted to the metallic disk, and resilient elements carried by the respective spokes between the enlarged heads and the annular flange.

4. In a vehicle wheel, a metallic disk having an offset peripheral flange, a transversely divided channel member having a flange, an elastic ring bolted between the respective flanges of the disk and channel members, a resilient tire bolted to the channel member, a plurality of spokes each having a cross head at one end bolted to the channel member and an enlarged head at its opposite end, an annular rubber ring concentric with the hub to receive the thrust of the enlarged heads of said spokes, an annular flange bolted to the disk, and a plurality of inclined brace rods bolted to said last named flange and to the metallic disk.

5. In a vehicle wheel, a metallic disk having an offset peripheral flange, an annular ring, an annular transversely divided channel member encircling said ring having offset flanges concentric with the peripheral flange of the disk, a rubber ring bolted between the respective flanges of the channel member and the peripheral flange of the disk, a resilient tire bolted to said channel member, a plurality of yieldable spokes secured at one end to the annular ring having enlarged heads at their opposite ends, a rubber ring concentric with the hub of the wheel to receive the thrust of the enlarged heads of the spokes, a flange bolted to said disk overlapping said last named ring, resilient elements between the heads of said spokes and said last named flange, and a plurality of brace rods bolted to said last named flange and the metallic disk.

6. In a vehicle wheel, a metallic disk having an offset peripheral flange, a metallic ring concentric with said flange, a rubber ring encircling the metallic ring, an annular transversely divided channel member having flanges concentric with the rubber ring, a plurality of bolts to unite the respective flanges and rings together, a rubber tire lodged in the channel member, a metallic ring within the channel member, yieldable spokes having cross-heads at one end secured to said last named ring and channel members, a plurality of bolts connecting the tire to the spokes and channel member, and a resilient element adapted to receive the thrust of the opposite end of the spokes.

In testimony whereof, I sign this specification in the presence of two witnesses.

JAMES D. GARLICK.

Witnesses:
MINNIE O. WIEGAND,
JOHN FITZPATRICK.

Copies of this patent may be obtained for five cents each, by addressing the "Commissioner of Patents, Washington, D. C."